United States Patent [19]

Freer

[11] Patent Number: 5,115,465
[45] Date of Patent: May 19, 1992

[54] SHOULDER REST

[76] Inventor: Lester P. Freer, 864 Brook Rd., Scottsville, N.Y. 14546

[21] Appl. No.: 469,267

[22] Filed: Jan. 24, 1990

[51] Int. Cl.⁵ .................................. H04M 1/00
[52] U.S. Cl. .............................. 379/449; 379/447
[58] Field of Search ................. 379/449, 447, 433

[56] References Cited

U.S. PATENT DOCUMENTS

| 2,310,252 | 2/1943 | Moomaw | 379/449 |
| 2,910,547 | 10/1959 | Cromer | 379/449 |
| 4,759,058 | 7/1988 | Sutton | 379/449 |

FOREIGN PATENT DOCUMENTS 738402 1/1945 Fed. Rep. of Germany ...... 379/449
846867 8/1952 Fed. Rep. of Germany ...... 379/449

OTHER PUBLICATIONS

C. Peters; Alien Property Custodian, Ser. No. 378,663; May 18, 1943.

Primary Examiner—James L. Dwyer
Assistant Examiner—Jason Chan
Attorney, Agent, or Firm—Larson and Taylor

[57] ABSTRACT

A removable friction-producing cushion and a wedge-shaped object attached to the surface of a telephone receiver/transmitter handset which enables a person to rest the handset on his shoulder, without slipping, by tipping his head and lightly squeezing the handset between his shoulder and his ear.

3 Claims, 1 Drawing Sheet

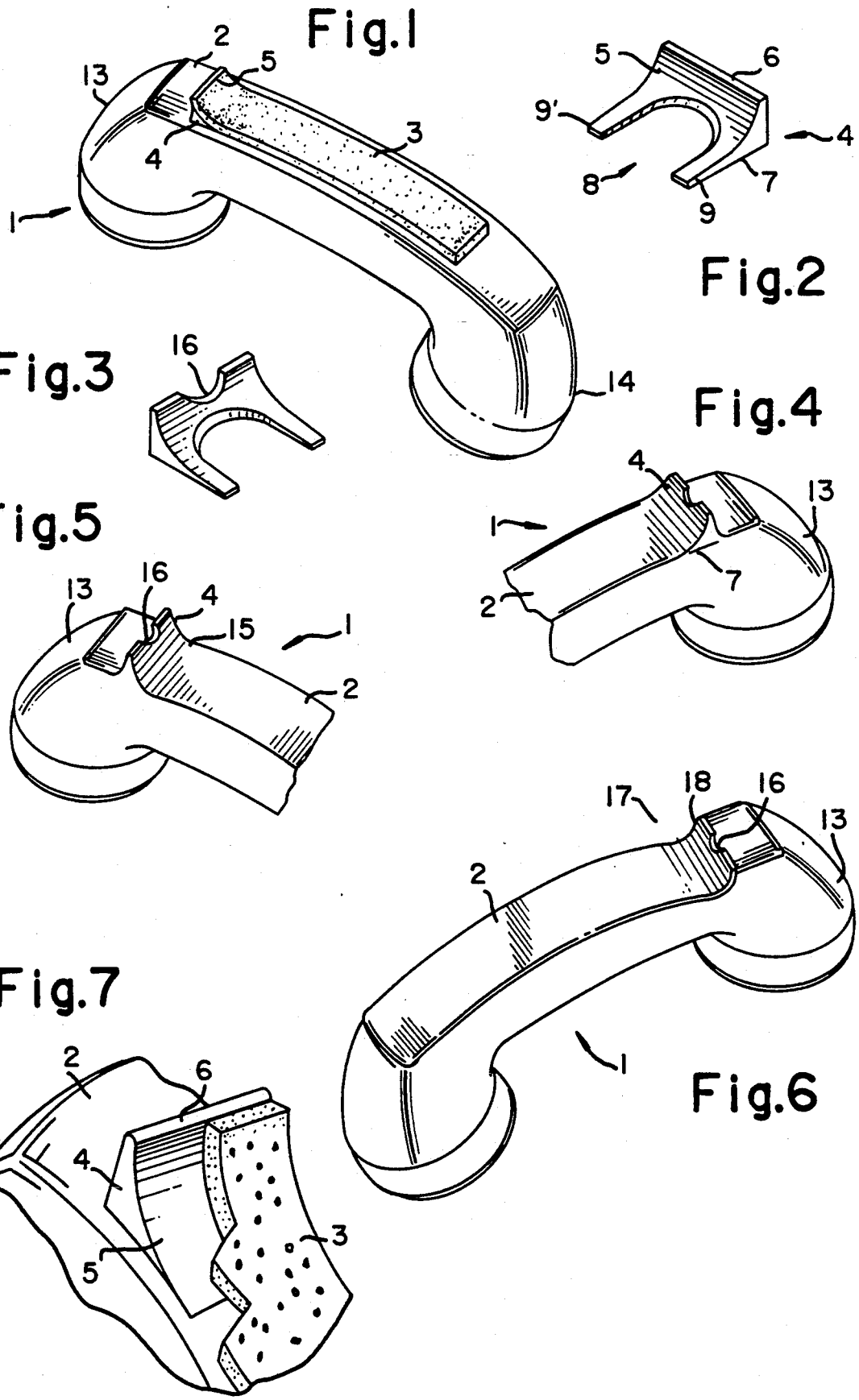

SHOULDER REST

BACKGROUND OF THE INVENTION

1. Field of the Invention

This invention relates generally to a telephone receiver/transmitter handset having attached to the outer surface thereof means for supporting the handset on the telephone user's shoulder.

2. Description of the Prior Art

There exist devices in the prior art which free one's hands while the receiver/transmitter handset is positioned securely on one's shoulder. U.S. Pat. Nos. 2,243,554, 2,486,438, 2,575,306, 2,802,062, 2,647,171, 2,863,954, and 3,163,722 disclose means which are clamped to the handset which permit the handset to be supported on one's shoulder. In such prior art devices, the support means are either mechanically fastened to the handset by screw-tightened clamps, or the like, or by relatively flexible "clips" which, in effect, snap into place on the handset and are frictionally engaged therewith. U.S. Pat. No. 3,567,871 discloses a support block which is adhesively secured to the handset. U.S. Pat. No. 4,320,264 discloses a pivotable support means which, when not in use, is designed to fold into a recess in the surface of the handset. These devices, however, are generally heavier and more cumbersome than the device disclosed in the instant application. None of the above references discloses a removable friction-producing cushion and a wedge-shaped object which are secured to the outer surface of the handset. Nor does the prior art teach or suggest integrally forming a wedge-shaped object on the outer surface of the handset.

SUMMARY OF THE INVENTION

The present invention relates to a telephone receiver/transmitter handset having a receiver and a transmitter at opposite ends of an integrated handle. The handle has an inner surface extending between the receiver and transmitter and an outer surface which extends substantially the length of the handset. The receiver end of the outer surface includes a wedge-shaped object secured thereto. The outer surface also includes a removable friction-producing cushion secured thereto. The removable friction-producing cushion extends substantially along the outer surface of the handset between the transmitter end and the receiver end of the receiver/transmitter handset. The removable friction-producing cushion has an end which is also secured to the wedge-shaped object. Preferably, the removable friction-producing cushion comprises a strip of open-celled or reticulated plastic foam material.

BRIEF DESCRIPTION OF THE DRAWINGS

FIG. 1 is a perspective view of a telephone transmitter/receiver handset having a wedge-shaped object and a removable friction-producing cushion attached to the surface of the handset.

FIG. 2 is a perspective view of a wedge-shaped object having an opening defining two base legs.

FIG. 3 is similar to FIG. 2 but shows the wedge-shaped object having a groove within its top surface.

FIG. 4 is a perspective view, partially cut away, of a telephone receiver/transmitter handset having a wedge-shaped object integrally formed on the surface of the handset.

FIG. 5 is a perspective view, partially cut away, of a telephone receiver/transmitter handset having a wedge-shaped object integrally formed and partially recessed within the surface of the handset.

FIG. 6 is a perspective view of a telephone transmitter/receiver handset having a recess defining an upwardly sloping surface.

FIG. 7 is a perspective view of a wedge-shaped object showing the removable friction-producing cushion (partly cut away) extending to a top surface of the wedge-shaped object.

DETAILED DESCRIPTION OF THE INVENTION

The following detailed description of the invention will be made with reference to the drawing figures appended hereto wherein like reference numerals refer to like drawing features. According to the embodiment shown in FIG. 1, a telephone receiver/transmitter handset 1 comprises a wedge-shaped object 4 secured to the outer surface 2 of the handset 1. A removable friction-producing cushion 3 is secured to the surface 5 of the wedge-shaped object 4 and to the outer surface 2 of the handset 1.

The purpose of the removable friction-producing cushion 3 is to provide a relatively high coefficient of friction between the outer surface 2 of the handset 1 and the user's shoulder. The relatively high coefficient of friction provides a force tending to prevent slippage of the handset 1 from its resting position on the user's shoulder. The handset can be securely cradled on the user's shoulder when the user tips his head and lightly squeezes the handset between his shoulder and his ear. With the handset securely in place, his hands are free for other tasks. Preferably, the removable friction-producing cushion 3 will comprise a strip of open-celled or reticulated plastic foam material.

It is important when a foam strip is used for cushion 3 that the foam material be open-celled or reticulated foam. When viewed under magnification, the surfaces of open-celled and reticulated foam materials are observed to have a large number of minute projections. The presence of such minute projections on the surface of open-celled and reticulated foam materials is responsible for the frictional resistance to slippage as discussed above. The minute projections interact with one's shoulder, or clothing covering the shoulder, to increase the coefficient of friction between the outer surface 2 of the handset 1 and the shoulder or clothing.

A relatively soft material is necessary to provide a cushioning effect. It is preferred that the material have a load deflection value of from 0.5 to 0.7 psi as measured by ASTM test method D-3574-81 or D-3574-77. A material having a load deflection value in this range will be sufficiently soft to conform to the shape of one's shoulder when the handset having the cushion 3 attached thereto is lightly squeezed between the user's shoulder and ear. The frictional resistance to slippage will be increased by maximizing the surface area of cushion 3 in contact with the user's shoulder.

A cell count of from 40–120 cells per inch for open cell foam materials and a pore count of from 40–120 pores per inch for reticulated foam materials are desirable. Materials having a cell or pore count in this range will have a sufficient number of minute projections to generate a desirable level of frictional resistance to slippage. A density of from 4–6 lb/ft$^3$ will generally have the preferred cell or pore count and will also have the preferred load deflection value. The above ranges were found to be preferable after extensive experimentation with a wide variety of different types of foam materials. Some of the foam materials tested included vinyl, rubber, polyethylene, polyurethane, etc. foams. The cell structures of the tested foams included the open cell, closed cell, and reticulated types of foams. When the cell or pore count was less than approximately 40 cells per inch, there were apparently too few of the minute projections on the surface of the foam material to effectively provide the frictional resistance needed to prevent slippage. While the foam material found to be most effective at preventing slippage was relatively soft, foam materials which were too stiff or too soft were found to be ineffective at reducing slippage.

While the removable friction-producing cushion 3 attached to the outer surface 2 of the handset 1 was found to be effective at reducing slippage, the combination of the cushion 3 and the wedge-shaped object 4 is more effective at preventing slippage. While the cushion 3 produces the frictional resistance as discussed above, the wedge-shaped object 4 positions over and somewhat into the shoulder muscle and further deters movement of the handset.

As shown in FIG. 2, the wedge-shaped object 4 comprises a surface 5 which is concave. The wedge-shaped object 4 further comprises an opening 8 in said surface 5 thereby defining two concave base legs, 9 and 9'. An end of the cushion 3 is preferably adhesively secured to the surface 5 and to the base legs 9 and 9' of the wedge-shaped object 4. The cushion 3 will generally extend to top surface 6 of the wedge-shaped object 4 thereby covering the entire surface 5. The cushion is also preferably adhesively secured to the outer surface 2 of the handset 1. The cushion 3 extends over the opening 8 and is also preferably adhesively secured to the outer surface 2 of the handset 1 which is exposed by the opening 8. Adhesive securement of the cushion 3 to the outer surface 2 of the handset exposed by the opening 8 effectively prevents movement of the wedge-shaped object.

The base 7 of the wedge-shaped object 4 can be shaped to conform to the particular shape of the handset surface. The cushion 3 can similarly be shaped to fit the particular handset surface. When the cushion 3 and wedge-shaped object 4 are secured to the outer surface 2 of the handset 1, the wedge-shaped object 4 will normally be positioned approximately 1-4 inches from the receiver end 13 of the handset 1 and the cushion 3 will extend toward the transmitter end 14 of the handset 1. The wedge-shaped object 4 will normally extend to a height of about ¼ to ½ inch above the outer surface 2 of the handset 1.

Adhesive may be applied directly to the outer surface 2 of the handset 1 and to base 7 of the wedge shaped object 4 prior to attachment of the wedge-shaped object 4 and cushion 3 thereto. Alternatively, adhesive may be applied to the cushion 3. The adhesive applied to the cushion 3 will normally be protected by a peelably removable covering until such time as the cushion 3 is to be secured to the surface 2 of the handset 1 and the wedge-shaped object 4. The adhesive applied to base 7 of the wedge-shaped object will also typically be protected by a peelably removable covering until such time as the wedge-shaped object 4 is to be secured to the surface 2 of the handset 1.

As shown in FIG. 3, the wedge-shaped object 4 may include a groove 16 within the top surface 6. The groove allows one to easily access the cushion 3 when it becomes damaged or worn and needs to be removed. By placing one's finger within the groove 16, the end of the cushion adjacent the groove may be readily pulled upwardly and peeled away from the wedge-shaped object 4 and from the outer surface 2 of the handset 1. A new cushion may then applied.

In the embodiment shown in FIG. 4, the wedge-shaped object 4 is integrally formed on the outer surface 2 of the handset 1. In this embodiment, the wedge-shaped object 4 may be formed during molding of handset 1. The base 7 of the wedge-shaped object 4 will then be integral with the outer surface 2 of the handset 1.

The embodiment of FIG. 5 shows the wedge-shaped object 4 partially recessed within the outer surface 2 of the handset 1. Reference numeral 15 represents the region where the wedge-shaped object 4 is recessed within the outer surface 2 of the handset 1.

In the embodiment of FIG. 6, the outer surface 2 of the handset 1 includes a recess 17 which defines an upwardly sloping outer surface 18. The outer surface 18 functions in a manner analogous to the manner in which the wedge-shaped object described in the other embodiments functions.

While certain specific embodiments of the invention have been shown and described herein, other embodiments obviously exist and it should be appreciated that the full scope of the invention is to be limited only by the claims appended hereto.

I claim:

1. An article of manufacture comprising a telephone handset comprising a handle, a receiver and a transmitter at opposite ends of said handle, said handle receiving an inner surface extending between said receiver and said transmitter and an outer surface which extends substantially the length of the handset; said outer surface including a wedge-shaped object positioned a short distance from the end of said receiver; said wedge-shaped object having a flat upper concave surface with its under surface shaped to fit the outer surface of said handset and terminating in an edge; a removable cushion comprising a strip of open-celled plastic foam material having a cell count of form 40–120 cells per inch, a density from 4–6 lb/ft$^3$ and a load deflection value measured by ASTM test method D-3574–81 or D-3574–77 from 0.5–0.7 psi, said cushion being secured to said concave surface of the wedge-shaped object and extending beyond the edge of said wedge substantially the length of said outer surface and secured thereto.

2. The article of manufacture of claim 1 wherein said removable cushion comprises a strip of reticulated foam material having a pore count of from 40–120 pores per inch, a density of from 4–6 lb/ft$^3$ and a load deflection value measured by ASTM test method D-3574-81 or D-3574-77 from 0.5-0.7 psi.

3. The article of manufacture of claim 1 wherein the wedge-shaped object further comprises a generally U-shaped opening in said concave surface thereby defining two generally parallel concave base legs with a portion of said outer surface exposed therebetween, said cushion also being secured to said exposed portion to thereby better secure said wedge-shaped object and said cushion to said outer surface.

* * * * *